United States Patent [19]

Hulshof

[11] Patent Number: 4,789,811
[45] Date of Patent: Dec. 6, 1988

[54] LINE DEFLECTION CIRCUIT IN A PICTURE DISPLAY DEVICE

[75] Inventor: Jozef J. M. Hulshof, Eindhoven, Netherlands

[73] Assignee: U.S. Philips Corporation, New York, N.Y.

[21] Appl. No.: 51,549

[22] Filed: May 18, 1987

[30] Foreign Application Priority Data

May 27, 1986 [NL] Netherlands .......................... 8601347

[51] Int. Cl.⁴ ............................................ H01J 29/56
[52] U.S. Cl. ..................................... 315/371; 315/387
[58] Field of Search ................ 315/370, 387, 408, 371

[56] References Cited

U.S. PATENT DOCUMENTS

| | | | |
|---|---|---|---|
| 3,999,102 | 12/1976 | Gent et al. ............................ | 342/408 |
| 4,024,434 | 5/1977 | Joosten et al. ....................... | 342/408 |
| 4,206,388 | 6/1980 | Ishigaki et al. ...................... | 342/408 |
| 4,242,714 | 12/1980 | Yoshida et al. ...................... | 342/408 |
| 4,516,169 | 5/1985 | Truskalo ............................. | 358/190 |
| 4,634,937 | 1/1987 | Haferl ................................. | 342/371 |
| 4,647,823 | 3/1987 | Luz ..................................... | 342/408 |
| 4,651,063 | 3/1987 | Reh ..................................... | 315/371 |
| 4,665,347 | 5/1987 | Walker et al. ....................... | 342/408 |
| 4,673,984 | 6/1987 | Kikuchi et al. ...................... | 315/411 |
| 4,719,392 | 1/1988 | Haferl ................................. | 342/371 |

*Primary Examiner*—Theodore M. Blum
*Assistant Examiner*—David Cain
*Attorney, Agent, or Firm*—Gregory P. Gadson

[57] ABSTRACT

A line deflection circuit in a picture display device in which a bidirectional supply switch controlled at the line frequency, as inductance and a bidirectional deflection switch likewise controlled at the line frequency are arranged in series between the terminals of a supply voltage source. A line deflection resonant network is connected to the deflection switch. By means of a forward control of the period of conductance of the supply switch the amplitude of the line deflection current is changed at the field frequency and by means of a feedback control of the said period this amplitude is maintained constant during a time interval which is short with respect to the duration of a field period. The line amplitude is substantially independent of the value of the line frequency and the trace capacitor is switchable as a function of the line frequency.

10 Claims, 2 Drawing Sheets

LINE DEFLECTION CIRCUIT IN A PICTURE DISPLAY DEVICE

BACKGROUND OF THE INVENTION

The invention relates to a circuit for the line deflection in a picture display device, comprising the series arrangement of a controllable semiconductor element, a controllable bidirectional deflection switch and a supply inductance, which series arrangement is connected between the terminals of a supply voltage source, further comprising a deflection resonant network including a line deflection coil which network is arranged parallel to the deflection switch, a first drive stage for applying a first drive signal to the semiconductor element for controlling the energy stored in the inductance with a feedback control in dependence upon the amplitude of the generated line deflection current flowing through the line deflection coil for maintaining the said amplitude constant, and with a forward control in dependence upon a field frequency signal for obtaining a field frequency variation of the amplitude of the line deflection current, and a second drive stage for applying a second drive signal to the deflection switch for line frequency rendering this switch alternately conducting, namely during the trace time of the line deflection current, and non-conducting, namely during the retrace time of the said current.

A circuit of this type has been proposed in the non-prepublished European Patent Application 195,392. A substantially constant value can be obtained for the amplitude of the line deflection current and hence for the width of the picture displayed, in spite of variations of, for example, the supply voltage and/or of loads connected to the circuit. This is ensured by the feedback control with which as information regarding the said amplitude, a direct voltage obtained by rectification of a pulse present in the circuit is applied to a comparison stage. In this stage a comparison is effected with a reference and the output signal of the comparison stage is applied to the semiconductor element for controlling the voltage across this element.

The raster distortion of the displayed picture is corrected by means of the forward control, and the variation caused thereby is superposed in a simple manner on the variation caused by the feedback control. The forward control is active throughout the field period, whereby the desired field-frequency variation is introduced accurately and without inertia. However, the variation of the line amplitude introduced in this way is counteracted by the feedback control and in order to still obtain an adequate variation the feedback control has to be slow with respect to the desired field frequency variation, which can be inadmissibly slow in view of the low value of the field frequency, so that this control is not capable of quickly reacting to changes in amplitude.

SUMMARY OF THE INVENTION

It is an object of the invention to realise a simple provision for improving the said circuit. To this end a circuit of the type described above is characterized in that the feedback control is active at the field frequency during a time interval which is not longer than approximately the duration of one field retrace.

Since, the feedback control is periodically activated for a short time, the line amplitude is maintained substantially constant during this time and during the rest of the time the forward control ensures the desired field-frequency variation of the line amplitude. The above-mentioned unwanted effect is prevented thereby.

The circuit according to the invention may be characterized in a simple manner in that the semiconductor element is in the form of a bidirectional supply switch, the first drive signal being at line frequency for rendering said switch alternately conducting and non-conducting. A circuit in which the feedback control generates a d.c. signal may be characterized in that the first drive stage is provided with a pulse duration modulator for controlling the period of conductance of the supply switch in dependence upon the d.c. signal applied to the said modulator and upon the field frequency signal also applied to the modulator.

In one embodiment the circuit is characterized in that a control loop for the feedback control comprises a sampling switch conducting during the occurrence of a field frequency sampling pulse and an integrator for generating the d.c. signal, the duration of the sampling pulse being not longer than approximately the duration of one field retrace.

It is a recognition of the invention that the circuit is particularly suitable for use if the line frequency may have different values. The circuit is further characterized in that the two drive signals originate from a line oscillator which forms part of a line synchronizing circuit and which generates a signal which is substantially in synchronism with an incoming line synchronizing signal whose frequency may have a plurality of values located in a given line frequency range, while the amplitude of the generated line deflection current is substantially independent of the value of the line frequency.

A circuit in which the deflection resonant network includes a trace capacitance arranged in series with the line deflection coil is characterized in that the trace capacitance is switchable as a function of the line frequency under the control of a circuit which is coupled to the line synchronizing circuit for receiving information regarding the value of the line frequency.

BRIEF DESCRIPTION OF THE DRAWINGS

The invention will be described in greater detail by way of example with reference to the accompanying drawings. In these drawings.

DETAILED DESCRIPTION OF THE INVENTION

Figure 1:
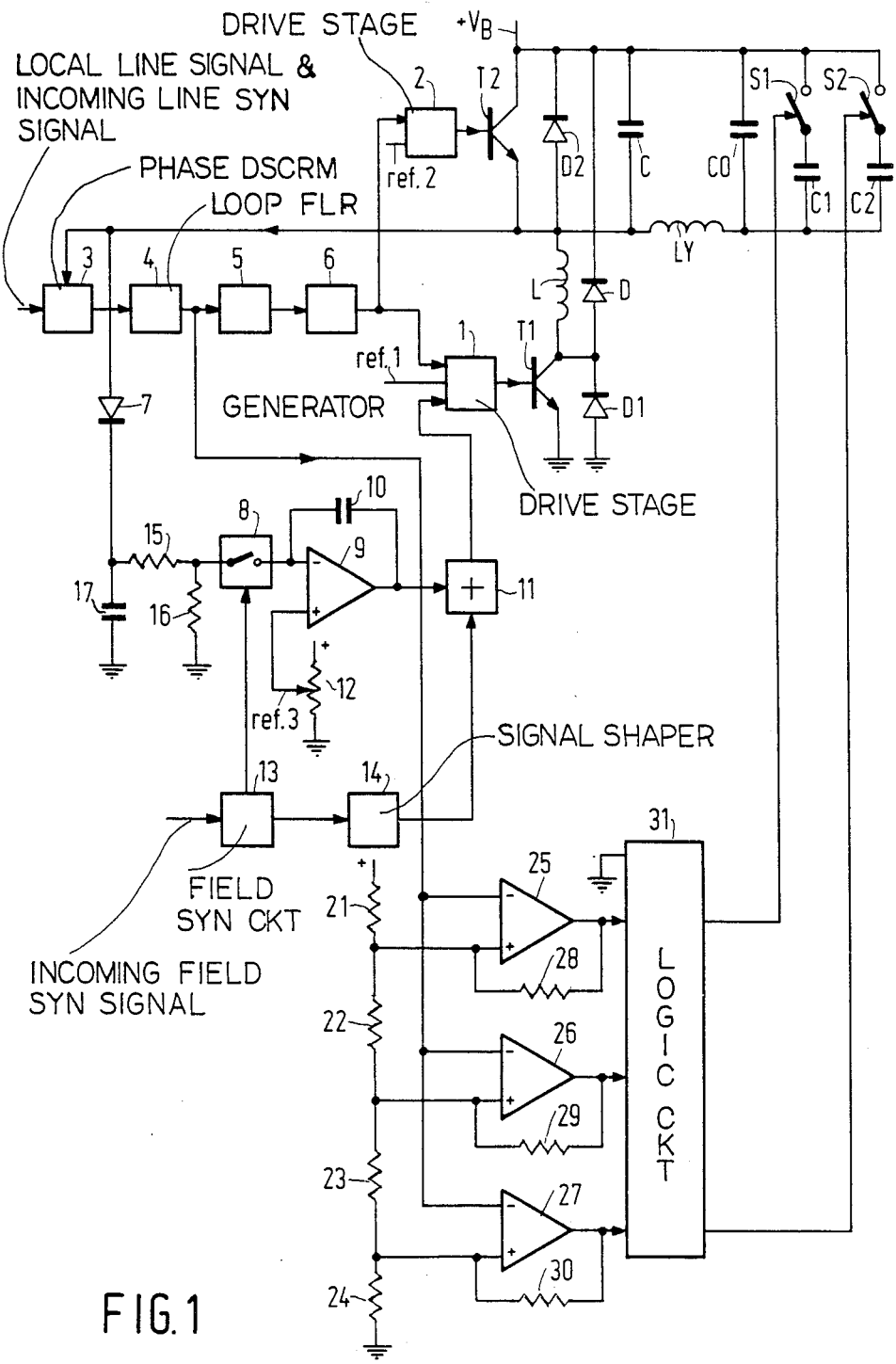
FIG. 1 shows a circuit diagram of the relevant part of a picture display device, for example, a television receiver or a monitor including the circuit according to the invention.

The line deflection circuit of FIG. 1 has a supply switch constituted by an npn transistor T1 and a diode D1 arranged in parallel therewith, while the cathode of the diode is connected to the collector of the transistor and the anode is connected to the emitter and to ground. The switch can thus conduct in two directions. Under circumstances diode D1 can be dispensed with, while transistor T1 then conducts inversely. One end of an inductance L is connected to this collector and to the cathode of diode D1 and the other end is connected to the emitter of an npn transistor T2 and to the anode of a diode D2. The collector of transistor T2 and the cathode of diode D2 are connected to the positive rail of a supply voltage source $V_B$ whose negative rail is connected to ground. Transistor T2 and diode D2 constitue a deflection switch which can also conduct in two directions, while diode D2 van be dispensed with in the same way as diode D1. The anode of a further diode D is connected to the junction point of the collector of transistor T1 and the cathode of diode D1, and the cathode of diode D is connected to the said positive rail. Thus, diodes D1 and D are reverse-biassed with respect to source $V_B$.

The series network of a line deflection coil LY and a trace capacitor C0 on the one hand and a retrace capacitor C on the other hand are arranged in parallel with switch T2, D2, the capacitance of capacitor C0 being many times larger than that of capacitor C. In a different way capacitor C may be incorporated between the junction point of elements T2, D2, L and LY and ground or may be arranged in parallel with coil LY. In all cases capacitor C is arranged in parallel with the deflection switch with respect to alternating current.

Switch T2, D2 and the resonant network consisting of elements LY, C and C0 constitute a line deflection circuit of known type. Transistor T2 receives line frequency control pulses from a drive stage 2, which pulses turn the transistor alternatively on and off. During the greater part of the line period, the trace time, switch T2, D2 conducts so that the trace voltage being present in the steady state across capacitor C0 produces a current through coil LY which flows through diode D2 during the first half of the trace time. Approximately at the central instant of the trace time the deflection current reverses its direction whereafter it flows through transistor T2. For this purpose the transistor has been turned on in time. At the end of the trace time transistor T2 is turned off under the influence of stage 2, which initiates the 'retrace of the deflection current. During the retrace time the current varies in a substantially cosine-shaped manner, the cosine function being determined by the inductances and the capacitances of the circuit. A negatively directed sinusoidal voltage pulse is present at the emitter of transistor T2, which pulse reaches a minimum at the central instant of the retrace time while the deflection current reverses its direction. The retrace time is terminated at the instant when the voltage at the emitter of transistor T2 again assumes the same value as before the retrace, i.e. the value of voltage $V_B$, so that diode D2 becomes conducting for passing the deflection current again.

The picture display device of which the present line deflection circuit forms part also includes a line synchronizing circuit for generating in known manner a local line signal which is substantially in synchronism with an incoming line synchronizing signal. The locally generated line signal and the incoming line synchronizing signal are applied to a phase discriminator 3 whose output voltage is smoothed by a loop filter 4. The smoothed voltage obtained is applied to a voltage-controllable line oscillator 5 for frequency and/or phase influencing the local signal generated by this oscillator. The signal of oscillator 5 can be applied to discriminator 3 in which it is compared with the incoming line synchronizing signal. Alternatively, a signal derived from the oscillator signal may serve as a local line signal, for example, a retrace pulse which is present in the line deflection circuit, for example, at the junction point of elements T2, D2, L, C and LY. In this case oscillator 5 is also controlled in dependence upon the delay which is caused by the turn-off time of transistor T2. The signal of oscillator 5 is applied to a sawtooth generator 6 for synchronizing this generator. The line frequency sawtooth-shaped signal obtained is converted in known manner by the control stage 2 into the (second) pulsatory signal driving transistor T2. For this purpose stage 2 receives a reference d.c. level ref. 2.

Losses in the deflection circuit are compensated for because current flows through inductance L to the resonant network during the retrace time, which current is produced be energy stored in the inductance during a previous interval. In fact, the resonant network is not short-circuited by switch T2, D2 during the retrace time. The quantity of energy which is stored in inductance L is dependent on the period of conductance of the supply switch T1, D1. The sawtooth-shaped line frequency signal generated by generator 6 is also applied to a drive stage 1 in which this signal is converted in known manner by means of a reference d.c. level ref. 1 into a (first) pulsatory signal driving transistor T1. During the line period the deflection switch T2, D2 has a constant period of conductance which covers the entire trace time. For this purpose the value of voltage ref. 2 is to be chosen in such a manner that transistor T2 is certainly turned on at the instant when the line deflection current reverses its direction. On the other hand, the period of conductance of the supply switch T1, D1 may be variable because drive stage 1 receives a third signal, more specifically for modulating the period of conductance of transistor T1.

The retrace pulse present at the junction point of elements T2, D2, L, C and LY is rectified by means of a diode 7 and a capacitor 17 together constituting a peak rectifier. The voltage obtained across the said capacitor is a measure of the amplitude of the line deflection current. For the same purpose the trace voltage across capacitor C0 or the voltage across a winding coupled to inductance L may be utilized. The rectified voltage is applied via a voltage divider consisting of two resistors 15 and 16 and a switching stage 8 to a differential amplifier 9 in which this voltage is compared with a reference direct voltage level ref. 3. A capacitor 10 is incorporated between the inverting input of amplifier 9 connected to stage 8 and the output of the amplifier for integrating the amplified signal. The output of amplifier 9 is also connected to an input of an adder stage 11 whose output is connected to the third input of stage 1. If other inputs of stage 11 are initially not considered and if switching stage 8 is assumed to be continuously conducting, then it will be evident from the foregoing that if the two input signals of amplifier 9 are equal, the output signal of stage 11 which is a d.c. level will not change and therefore the period of conductance of transistor T1 will not change either. If on the other hand the amplitude of the line deflection current changes for some reason or other, for example, due to fluctuations in the voltage $V_B$, then the peak amplitude of the retrace pulse changes and hence the value of the voltage at the inverting input of amplifier 9. This results in a shift in time of the turn-on instant of transistor T1 and therefore in a variation of the quantity of energy which is stored in inductance L so that the change in amplitude of the deflection current is counteracted. It appears therefrom that elements 7, 9, 10 and 11 form part of a control loop for maintaining the said amplitude constant by means of a pulse duration modulation of the drive pulses applied to transistor T1. Due to this feedback control an automatic fine adjustment of the line amplitude, hence of the width of the displayed picture, is obtained. A coarse adjustment is obtained because the voltage ref. 3 at the non-inverting input of amplifier 9 is adjustable by means of a potentiometer 12.

The foregoing applies to the case when the line amplitude is the same for all lines written on the display screen of a picture display tube (not shown) for forming the displayed picture. However, as a rule it is desirable that this amplitude is not the same for all lines, particularly because the picture is then displayed in a distorted way. A correction is therefore performed at which the amplitude of the line deflection current is changed at the field frequency. Such a field frequency amplitude modulation of the current is, for example, the east-west modulation at which the field frequency envelope is parabolic with a maximum in the centre of the field trace time. This modulation can be performed with the circuit of FIG. 1 because the turn-on instant of transistor T1 is shifted at the field frequency. A field synchronizing circuit 13 generates a field frequency signal in known manner which is substantially in synchronism with an incoming field synchronizing signal and which is applied to a signal shaper 14 supplying the suitable, for example, parabolically varying d.c. level to a second input of adder stage 11. However, this measure is not sufficient. In fact, it will be evident that the variation of the line amplitude introduced in this manner is counteracted by the above-described amplitude control. In order to obtain an adequate variation the control loop would have to be slow with respect to the desired field frequency variation, which could be inadmissibly low in view of the low value of the field frequency so that the loop would not be capable of reacting to amplitude changes. For this reason the loop is periodically activated for a short period by means of switching stage 8 and is rendered inactive for the remaining period. This is ensured by a field frequency switching pulse originating from circuit 13 and having a duration which is short relative to a field period, for example, approximately 100 μs relative to 20 ms (which is the field period in accordance with the European television standard) during which duration stage 8 is conducting for passing on the voltage rectified by rectifier 7 to amplifier 9, while stage 8 is cut off during the rest of the field period and the loop is interrupted.

It appears from the foregoing that the east-west modulation is performed by means of a forward control of the period of conductance of the supply switch T1, D1 because the turn-on instant of transistor T1 is shifted at the field frequency, while the feedback amplitude control of the said duration for maintaining the line amplitude constant is only active during the occurrence of the pulse applied to switching stage 8. The rectified retrace pulse is sampled by means of stage 8, the value obtained being maintained during the rest of the field period by means of capacitor 10. In this manner the amplitude of one given line is maintained substantially constant. The elements of the sampling circuit, particularly elements 10, 15 and 16 and the duration of the sampling pulse applied to stage 8 can be chosen to be such that the amplitude is substantially constant after one field period. The duration of the sampling pulse is then little critical: a duration of some line periods is also suitable, but it will be evident that the pulse must not be too long to obtain the correct amplitude variation. If the pulse occurs during the field retrace time, a longer duration is possible because a possible distortion is invisible. The maximum duration of the pulse thus covers approximately the duration of the field retrace. In a practical circuit a pulse has been chosen with a duration of approximately 100 μs just before the end of the field trace time.

FIG. 2 shows some waveforms for the purpose of clarification: FIG. 2a shows the variation as a function of time of the voltage at the collector of transistor T1; FIG. 2b shows the variation of the voltage at the emitter of transistor T2; FIG. 2c shows the variation of the voltage present across inductance L and FIG. 2d shows the variation of the current through this inductance. In these diagrams broken lines illustrate the variation which takes place at an amplitude of the line deflection current which is smaller than the variation illustrated by means of a solid line. In the Figures the reference t1 denotes the instant when transistor T1 is turned on. Before instant t1 current flows through inductance L1 via diode D back to source $V_B$, which current is constant because the voltage across the inductance is substantially zero. The voltage at the emitter of transistor T2 is in fact substantially equal to $V_B$. After instant t1 the voltage across inductance L is approximately equal to $V_B$ and the current therethrough increases linearly. At the instant t2, when transistor T2 is turned off, the retrace is initiated. The waveforms of FIGS. 2b and c then vary in accordance with the previously mentioned sine function, whilst the current of FIG. 2d varies in accordance with the aforementioned cosine function. The reference t3 denotes the central instant of the retrace time at which instant both sine functions reach the minimum and t4 denotes the final instant of the retrace time at which instant the voltage at the emitter of transistor T2 again becomes equal to $V_B$ which renders diode D2 conducting. At a given instant before instant t4 the current through inductance L reverses its direction whereafter this current no longer flows through transistor T1 but through diode D1. After instant t4 the voltage across inductance L is again equal to approximately $V_B$ so that the current therethrough varies linearly. This situation ends at the instant t5 when transistor T1 is turned off, whereafter the current has a constant value, whilst the voltage across the inductance is substantially zero. Due to the losses the current does not reverse its direction at instant t3 but after this instant for supplying energy to the deflection resonant network. After instant t5 nothing changes in the supply section of the circuit of FIG. 1, more specifically until transistor T1 is again turned on at an instant which is one line period later than instant t1.

Figure 2A:
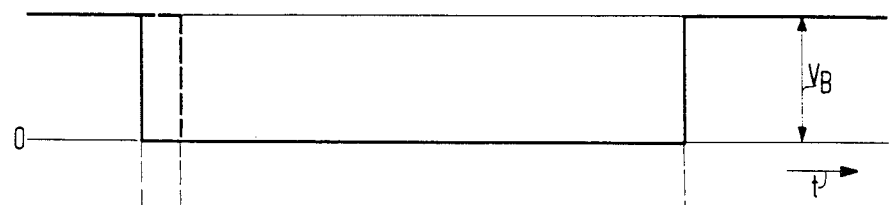
FIG. 2a–2d shows some waveforms occurring therein.
Figure 2B:
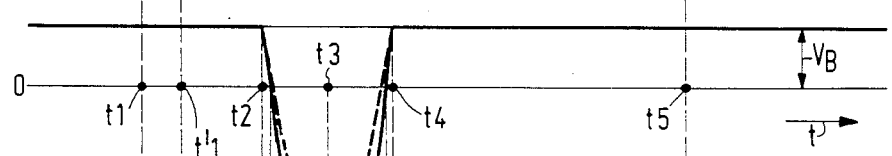
Figure 2C:
Figure 2D:
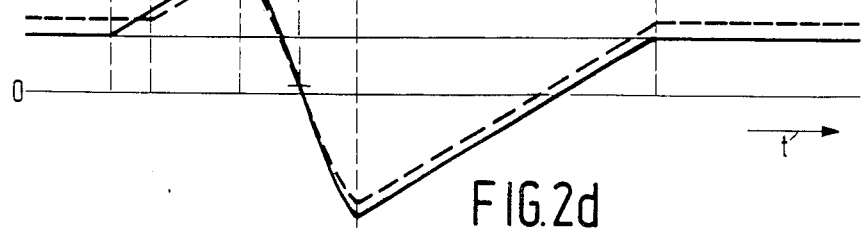

Since the mean value of the voltage across inductance L is zero during one line period, the total surface area above the zero axis which is bounded by the curve representing the voltage variation and this axis in FIG. 2c is equal to the corresponding surface area which is below the zero axis. If the incoming line synchronizing pulses have a different repetition frequency than the frequency considered so far, while voltage $V_B$ is unchanged, nothing changes in FIG. 2. Only the trace time commencing at instant t4 whose final instant is one line period later than instant t2 has a different duration. It thus appears that the period of conductance from t1 to t5 of transistor T1 is not dependent on the line frequency. If the circuit of FIG. 1 is to be made suitable for more than one value of the line frequency, the line synchronizing circuit should be designed in such a manner that oscillator 5 is always operative in synchronism with the incoming signal.

If the amplitude of the line deflection current at a constant line frequency varies, for example, if this amplitude decreases, then the energy level in the deflection resonant network varies accordingly. Consequently the amplitude of the retrace pulse and that of the current through inductance L also vary accordingly. In FIG. 2 these values become smaller. Since the surface area below the zero axis in FIG. 2c is then smaller, the period of conductance of transistor T1 starts at a later instant than T1. This happens due to the action of the control loop with elements 7, 8, 10 and 11 so that transistor T1 is turned on at an instant t'1. If on the other hand the amplitude of the line deflection current increases, instant t1 occurs earlier and transistor T1 is in its state of conductance for a longer time. It appears therefrom that the period of conductance of this transistor is indeed controlled for maintaining the line amplitude constant. A given period of conductance of transistor T1 and hence a given line amplitude can be arbitrarily adjusted by means of potentiometer 12. Consequently the amplitude during the occurrence of the sampling pulse applied to stage 8 is in fact adjusted, while during the remaining period the amplitude undergoes the variation which is determined by signal shaper 14. It will be noted that whereas the duration of the interval t1–t5 is important, its position with respect to time is of no importance provided that it embraces the retrace time. This is apparent from FIG. 2c. This implies that instant t1 is located in a trace time and instant t5 is located in the subsequent trace time, whilst the time interval between the two instants but not the position of the instants is determined by the above-mentioned adjustment and control. The foregoing also implies that either the position of one of the said instants is controlled, whereas the position of the other instant is fixed in the line period, that is to say, this other instant is a fixed time later than the instant of commencement of the trace time, or that the position of the two instants is controlled.

It will be evident that some variants can be considered in the circuit of FIG. 1 without changing the operation of the circuit. For example, diode D may be replaced by a controllable switching element. The deflection and the supply switches may change places, with the cathode of diode D being connected to the above-shown end of inductance L and the anode of the diode being connected to ground. The comparison stage 9 may be provided between the capacitor 17 and the voltage divider 15, 16, with the integrating capacitor 10 then being disposed between stage 8 and ground.

If the circuit of FIG. 1 is used for several values of the line frequency, the retrace time is not changed. This means that the capacitance of capacitor C, which is the most important parameter for determining the retrace timing, remains unchanged. A change in the retrace time in fact implies a change in the line amplitude, which is not possible due to the feedback control. However, the capacitance of the trace capacitor must be changed. This capacitance in fact determines the S-shape of the line deflection current. For this purpose the circuit of FIG. 1 comprises the series network of, for example, 4 resistors 21, 22, 23 and 24 arranged between a positive direct voltage and ground. The junction point of resistors 21 and 22 is connected to a non-inverting input of an amplifier 25 operating as a comparison stage an inverting input of which is connected to the output of the loop filter 4. A positive feedback resistor 28 is incorporated between the non-inverting input of amplifier 25 and the output of the amplifier. Similarly, the junction point of resistors 22 and 23 is connected to a non-inverting input of an amplifier 26 and the junction point of resistors 23 and 24 is connected to a non-inverting input of an amplifier 27. The output of filter 4 is connected to an inverting input of amplifiers 26 and 27, respectively. Amplifier 26 is provided with a positive feedback resistor 29 and amplifier 27 is provided with a positive feedback resistor 30. The output voltages of amplifiers 25, 26 and 27 are applied to a logic circuit 31. 2 switches S1 and S2 are operated by means of the logic circuit 31. Switch S1 is in series with a capacitor C1 and the series network formed is in parallel with capacitor C0. Similarly switch S2 constitutes a series network with a capacitor C2, which network is also in parallel with capacitor C0.

The voltage which is present at the output of filter 4, for example, across a smoothing capacitor is the control voltage for controlling line oscillator 5. This voltage is a direct indication about the line frequency. By means of amplifiers 25, 26 and 27 this voltage is compared each time with a voltage which is obtained by means of the voltage divider constituted by resistors 21 to 24 inclusive. The output voltage of amplifier 25 has a value which depends on the difference between the control voltage and the voltage at the junction point of resistors 21 and 22. Similarly, the output voltage of amplifier 26 depends on the difference between the control voltage and the voltage at the junction point of resistors 22 and 23, which voltage is lower than the voltage at the junction point of resistors 21 and 22. Finally, the output voltage of amplifier 27 depends on the difference between the control voltage and the voltage at the junction point of resistors 23 and 24, which voltage is lower than the voltage at the junction point of resistors 22 and 23. In this manner 3 values for the line frequency and hence 4 frequency sub-ranges are distinguished. Due to the choice of resistors 21 to 24 inclusive these frequency sub-ranges may be arbitrarily chosen, for example, to be equal within the broad line frequency range for which the circuit is suitable. A hysteresis is obtained for each of the amplifiers 25, 26 and 27 by means of resistors 28, 29 and 30 so that the frequency sub-ranges partly cover each other.

Circuit 31 is a so-called 2-out-of-4-decoder also referred to as 4-input-priority encoder. Circuit 31 has 4 inputs one of which is connected to ground while the other 3 are connected to the outputs of the respective amplifiers 25, 26 and 27. Each of the two outputs can convey a logic 0 or a 1, i.e. there are 4 possibilities for changing over switches S1 and S2 in dependence upon the state at the inputs: all 4 inputs may be "low" or one of the inputs may be "high". If none of the two switches is conducting, the trace capacitance in the deflection network is the capacitance of capacitor C0. If switch S1 conducts, the trace capacitance is the sum of the capacitances of capacitors C0 and C1. If switch S2 conducts, the trace capacitance is the sum of the capacitances of capacitors C0 and C1 and, finally, if the two switches S1 and S2 conduct, the trace capacitance is the sum of the capacitances of capacitors C0, C1 and C2. In this manner the correct trace capacitance can be provided for each frequency sub-range in the circuit, on the understanding that for a correct geometry of the displayed picture the trace capacitance must be smaller as the line frequency is higher.

A finer distribution of the frequency range and hence a more accurate S-correction can be obtained by using a larger number of comparison stages than was the case in the embodiment described. With, for example, 8 resistors instead of the 4 resistors 21 to 24 inclusive and 7 amplifiers instead of the 3 amplifiers 25, 26 and 27 the line frequency range is divided into 8 sub-ranges. In this case circuit 31 is a 3-out-of-8-decoder, also referred to as 8-input-priority encoder, for example, of the Philips type HEF4532B. With 3 outputs circuit 31 can operate three switches each being in series with a capacitor for arranging this capacitor in parallel with capacitor C0. In this manner 8 switching possibilities are obtained, with capacitor C0 either being alone or being arranged in parallel with one or two or the three other capacitors. Generally an n-out-of-$2^n$ decoder and $2^n-1$ comparison stages can be used for which the line frequency range is divided into $2^n$ sub.ranges and n capacitors can be arranged in parallel with capacitor C0. In this case n is an integer. In the simplest case in which n=1 one amplifier operating as a comparison stage will suffice, which implies only two frequency sub-ranges, and one switchable S capacitor. The use of a decoder as described provides the advantage that for a number of switchable S capacitors the number of switching possibilities and the number of sub-ranges can be much higher. With such a fine distribution the line deflection current can be given the correct shape at substantially any line frequency.

It will be noted that the control voltage made available by the loop filter 4, which voltage has a given value as a function of the line frequency, is not the only usable information about the line frequency. Other information which is also usable for change-overs in the deflection resonant network is, for example, the duration between two successive line synchronizing pulses, which duration can be accurately measured by counting a number of clock pulses. If, differently from FIG. 1, the local line frequency is obtained by dividing the frequency of the signal of an oscillator oscillating at a higher clock frequency, the frequency divider circuit being controlled for synchronizing the local line signal with the incoming line synchronizing signal, then the value of the divider can be utilized as information regarding the line frequency.

I claim:

1. A circuit for a line deflection in a picture display device, comprising the series arrangement of a controllable semiconductor element, a controllable bidirectional deflection switch and a supply inductance, which series arrangement is coupled between terminals of a supply voltage source, further comprising a deflection resonant network including a line deflection coil which network is arranged parallel to the deflection switch, a first drive stage for applying a first drive signal to the semiconductor element for controlling energy stored in the inductance with a feedback control in dependence upon an amplitude of a generated line deflection current flowing through the line deflection coil for maintaining the said amplitude constant, and with a forward control in dependence upon a field frequency signal for obtaining a field frequency variation of the amplitude of the line deflection current and a second drive stage for applying a second drive signal to the deflection switch for line frequency rendering this switch alternately conducting, namely during a trace time of the line deflection current, and non-conducting, namely during a retrace time of the said current, characterized in that the feedback control is active at the field frequency during a time interval which is not longer than approximately a duration of one field retrace.

2. A circuit as claimed in claim 1, characterized in that the semiconductor element is in the form of a bidirectional supply switch, the first drive signal being at line frequency for rendering said switch alternately conducting and non-conducting.

3. A circuit as claimed in claim 2, in which the feedback control generates a d.c. signal, characterized in that the first drive stage is provided with a pulse duration modulator for controlling the period of conductance of the supply switch in dependence upon the d.c. signal applied to the said modulator and upon the field frequency signal also applied to the modulator.

4. A circuit as claimed in claim 1, characterized in that a control loop for the feedback control comprises a sampling switch conducting during the occurrence of a field frequency sampling pulse and an integrator for generating the d.c. signal, the duration of the sampling pulse being not longer than substantially the duration of one field retrace.

5. A circuit as claimed in claim 2, characterized in that the first drive signal determines the location with respect to time of the switch-on instant of the supply switch.

6. A circuit as claimed in claim 2, characterized in that the two drive signals originate from a line oscillator which forms part of a line synchronizing circuit and which generates a signal which is substantially in synchronism with an incoming line synchronizing signal whose frequency may have a plurality of values located in a given line frequency range, while the amplitude of the generated line deflection current is substantially independent of the value of the line frequency.

7. A circuit as claimed in claim 6, in which the deflection resonant network includes a trace capacitor arranged in series with the line deflection coil, characterized in that the trace capacitor is switchable as a function of the line frequency under the control of a circuit which is coupled to the line synchronizing circuit for receiving information regarding the value of the line frequency.

8. A circuit as claimed in claim 7, characterized in that an input signal of the circuit for controlling the said change-over is a control signal generated for the purpose of controlling the line oscillator in the line synchronizing circuit.

9. A circuit as claimed in claim 7, characterized in that an input signal of the circuit for controlling the said change-over is dependent on a frequency sub-range in which the frequency of the incoming line synchronizing signal is located.

10. A circuit as claimed in claim 9, characterized in that the trace capacitor is switchable by means of n switches between $2^n$ possible values, the line frequency range being divided into $2^n$ sub-ranges and n being an integer.

* * * * *